(12) United States Patent  
Agarwal et al.

(10) Patent No.: US 12,120,549 B2  
(45) Date of Patent: Oct. 15, 2024

(54) USER EQUIPMENT PROCEDURE FOR BUFFER STATUS REPORT

(71) Applicant: QUALCOMM Incorporated, San Diego, CA (US)

(72) Inventors: Nitin Agarwal, San Diego, CA (US); Sitaramanjaneyulu Kanamarlapudi, San Diego, CA (US); Joe Thomas, San Diego, CA (US); Girish Khandelwal, San Diego, CA (US); Deepak Wadhwa, San Diego, CA (US); Dinesh Kumar Devineni, San Diego, CA (US); Thang Tu, San Diego, CA (US); Gangaram Patidar, San Diego, CA (US); Talha Patel, San Diego, CA (US); Farhad Tavassoli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 17/738,933

(22) Filed: May 6, 2022

(65) Prior Publication Data  
US 2023/0362713 A1 Nov. 9, 2023

(51) Int. Cl.  
*H04W 28/02* (2009.01)  
*H04L 27/26* (2006.01)  
(Continued)

(52) U.S. Cl.  
CPC ..... *H04W 28/0278* (2013.01); *H04L 27/2614* (2013.01); *H04W 28/22* (2013.01); *H04W 84/06* (2013.01)

(58) Field of Classification Search  
None  
See application file for complete search history.

(56) References Cited

U.S. PATENT DOCUMENTS

| | | | |
|---|---|---|---|
| 2009/0113086 A1* | 4/2009 | Wu | H04W 72/21 710/56 |
| 2013/0094455 A1* | 4/2013 | Wu | H04W 28/0278 370/328 |

(Continued)

OTHER PUBLICATIONS

Huawei., et al., "BSR for One LCG Case", 3GPP TSG-RAN WG2 #102, R2-1807443, 3rd Generation Partnership Project (3GPP), Mobile Competence Centre, 650, Route Des Lucioles, F-06921 Sophia-Antipolis Cedex, France, vol. RAN WG2, No. Busan, Korea, May 21, 2018-May 25, 2018, May 20, 2018, 6 Pages, XP051443834, Section 2, p. 1-p. 5.

(Continued)

*Primary Examiner* — Kouroush Mohebbi  
(74) *Attorney, Agent, or Firm* — Loza & Loza, LLP

(57) ABSTRACT

Methods and apparatus configured to obtain a decision-point value, and send, for a logical channel group (LCG) having a quantity of data pending an uplink transmission, a long buffer status report in response to the decision-point value exceeding a threshold value, or a short buffer status report in response to the decision-point value being equal to or less than the threshold value are disclosed. The decision-point value may be a buffer status report-type determinative value, which may be based on a peak power envelope of a wireless communication device, a data transmission rate historically obtained by the wireless communication device, a number of component carriers available for a complete upload of a buffer holding data, a cost function, an amount of data associated with the LCG that is pending the uplink transmission, a type of the wireless communication device, or a latency of communications of the wireless communication device.

30 Claims, 7 Drawing Sheets

(51) Int. Cl.
*H04W 28/22* (2009.01)
*H04W 84/06* (2009.01)

(56) References Cited

U.S. PATENT DOCUMENTS

| | | | |
|---|---|---|---|
| 2013/0107722 A1* | 5/2013 | Huang | H04W 72/51 |
| | | | 370/241 |
| 2021/0203436 A1 | 7/2021 | Jiang | |
| 2021/0274530 A1 | 9/2021 | Sebire et al. | |

OTHER PUBLICATIONS

Huawei., et al., "WF on BSR for One LCG Case", 3GPP TSG-RAN WG2 Adhoc NR#1807, R2-1810231, 3rd Generation Partnership Project (3GPP), Mobile Competence Centre, 650, Route Des Lucioles, F-06921 Sophia-Antipolis Cedex, France, vol. RAN WG2, No. Montreal, Canada, Jul. 2, 2018-Jul. 6, 2018, Jul. 1, 2018, 3 Pages, XP051467416, Section 2, p. 1.
International Search Report and Written Opinion—PCT/US2023/017326—ISA/EPO—Jun. 27, 2023.

\* cited by examiner

USER EQUIPMENT PROCEDURE FOR BUFFER STATUS REPORT

TECHNICAL FIELD

The technology discussed below relates generally to user equipment procedures for buffer status reports, and more particularly, to a user equipment enhanced procedure for buffer status report reporting to optimize network uplink component carrier activation and improve network performance.

INTRODUCTION

User equipment (UE) may buffer data that is awaiting uplink transmission until resources for the uplink transmission of that data are scheduled. Therefore, data may accumulate in one or more buffers while awaiting the generation of packet data units (PDUs) configured to transport the accumulated data in the uplink direction. The buffered data may be grouped according to logical channels. One or more logical channel groups (LCGs) may be established. The UE may be triggered to transmit a buffer status report (BSR) to a network from time to time. The content of the BSR informs the network of an amount of data awaiting uplink transmission that is stored in the buffer (or buffers) of the UE. The network may allocate resources, such as one or more component carriers, to the UE based, in part, on the amount of data stored in the buffer (or buffers) of the UE that is awaiting uplink transmission.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a wireless communication device is disclosed. The wireless communication device includes a wireless transceiver, a memory, and a processor communicatively coupled to the wireless transceiver and the memory. In this example, the processor and the memory are configured to: obtain a decision-point value; send, for a logical channel group having a quantity of data pending an uplink transmission, a long buffer status report in response to the decision-point value exceeding a threshold value; and send, for the logical channel group, a short buffer status report in response to the decision-point value being equal to or less than the threshold value.

In another example, a method at a wireless communication device is disclosed. The method includes: obtaining a decision-point value; sending, for a logical channel group having a quantity of data pending an uplink transmission, a long buffer status report in response to the decision-point value exceeding a threshold value; and sending, for the logical channel group, a short buffer status report in response to the decision-point value being equal to or less than the threshold value.

In still another example, a wireless communication device is disclosed. The wireless communication device includes: means for obtaining a decision-point value; means for sending, for a logical channel group having a quantity of data pending an uplink transmission, a long buffer status report in response to the decision-point value exceeding a threshold value; and means for sending, for the logical channel group, a short buffer status report in response to the decision-point value being equal to or less than the threshold value.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
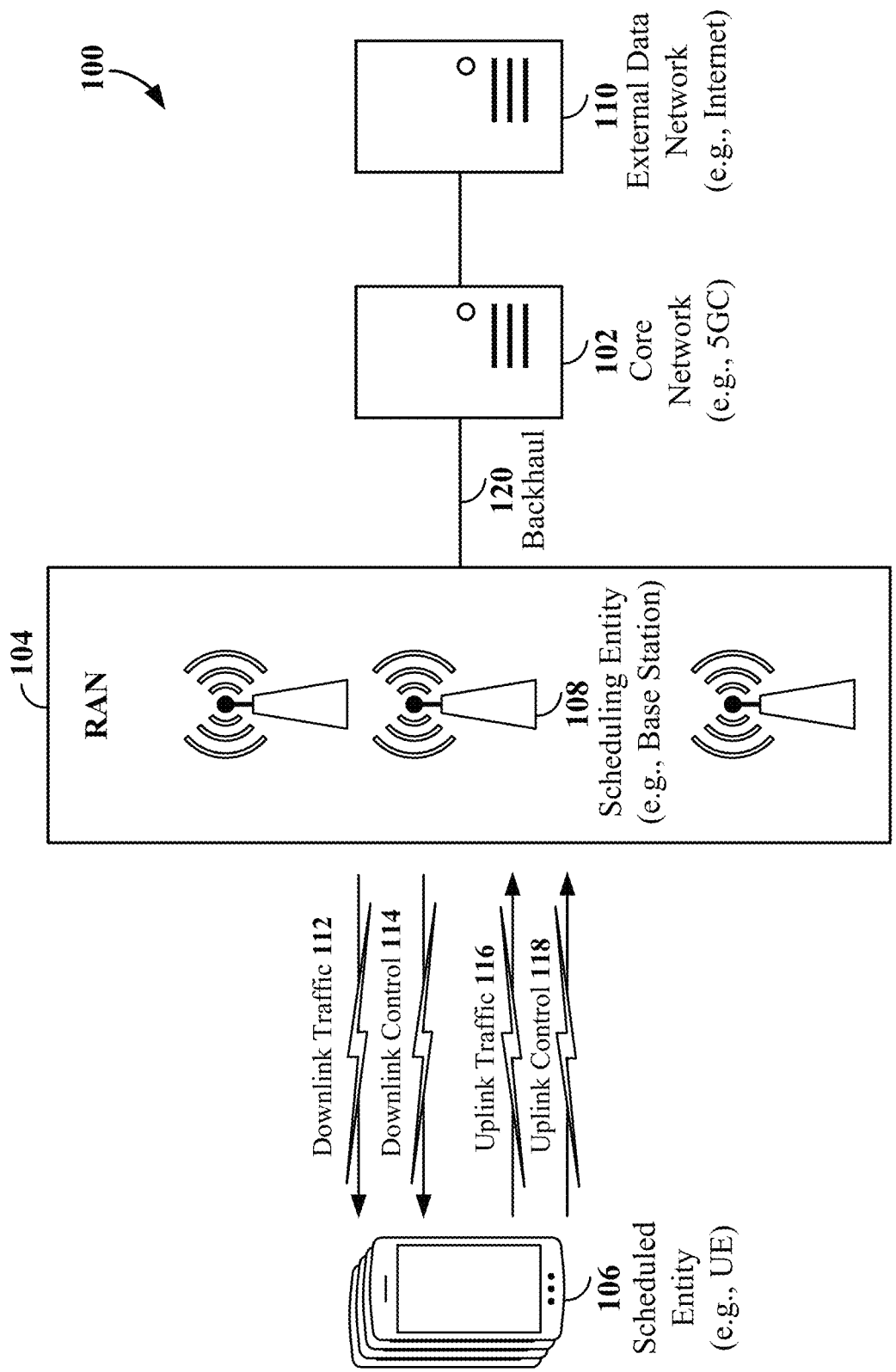
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some examples, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/ purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or user equipment (UE)), end-user devices, etc. of varying sizes, shapes, and constitution.

Described herein are methods and apparatus directed toward a process of determining to send a short buffer status report (BSR) or a long BSR from a wireless communication device based on an evaluation of at least one parameter that may be associated with, for example: a peak power envelope of the wireless communication device, a data transmission rate historically obtained by the wireless communication device, a number of component carriers available to be scheduled for a complete upload of a buffer holding data, a cost function, an amount of data associated with the logical channel group that is pending the uplink transmission, a type of the wireless communication device, or a latency of communications of the wireless communication device.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF-chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control 118 and/or 118 information and/or uplink and/or downlink traffic 116 and/or 112 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5G core (5GC)). In other examples, the core network 102 may be configured according to a 4G evolved packet core (EPC), or any other suitable standard or configuration.

Figure 2:
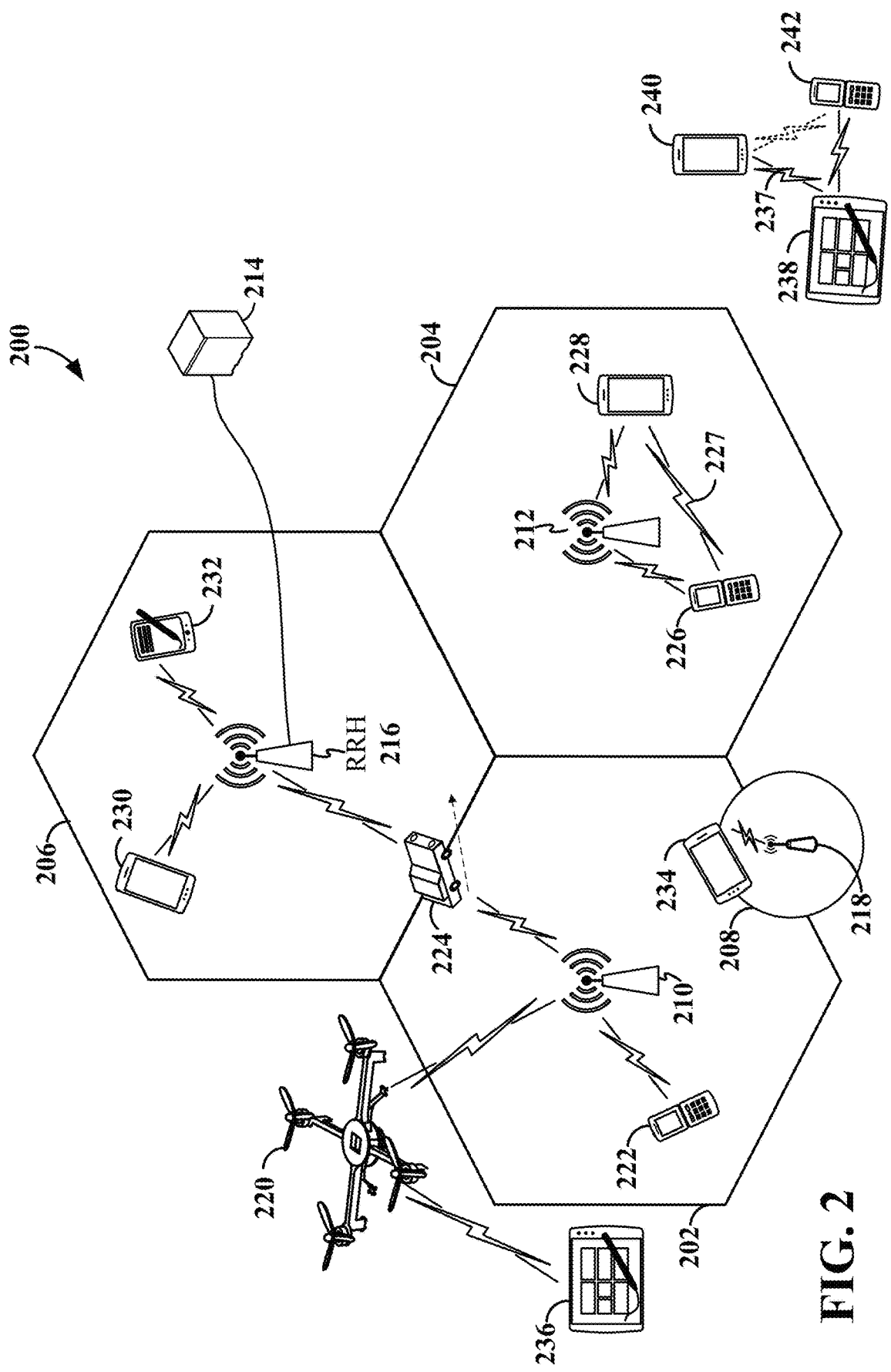
FIG. 2 is a schematic illustration of an example of a radio access network (RAN) according to some aspects of the disclosure.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into the mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full-duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described hereinbelow. That is, while some examples of the present disclosure may focus on an OFDM link for clarity, it should be understood that the same principles may be applied as well to SC-FDMA waveforms.

Figure 3:
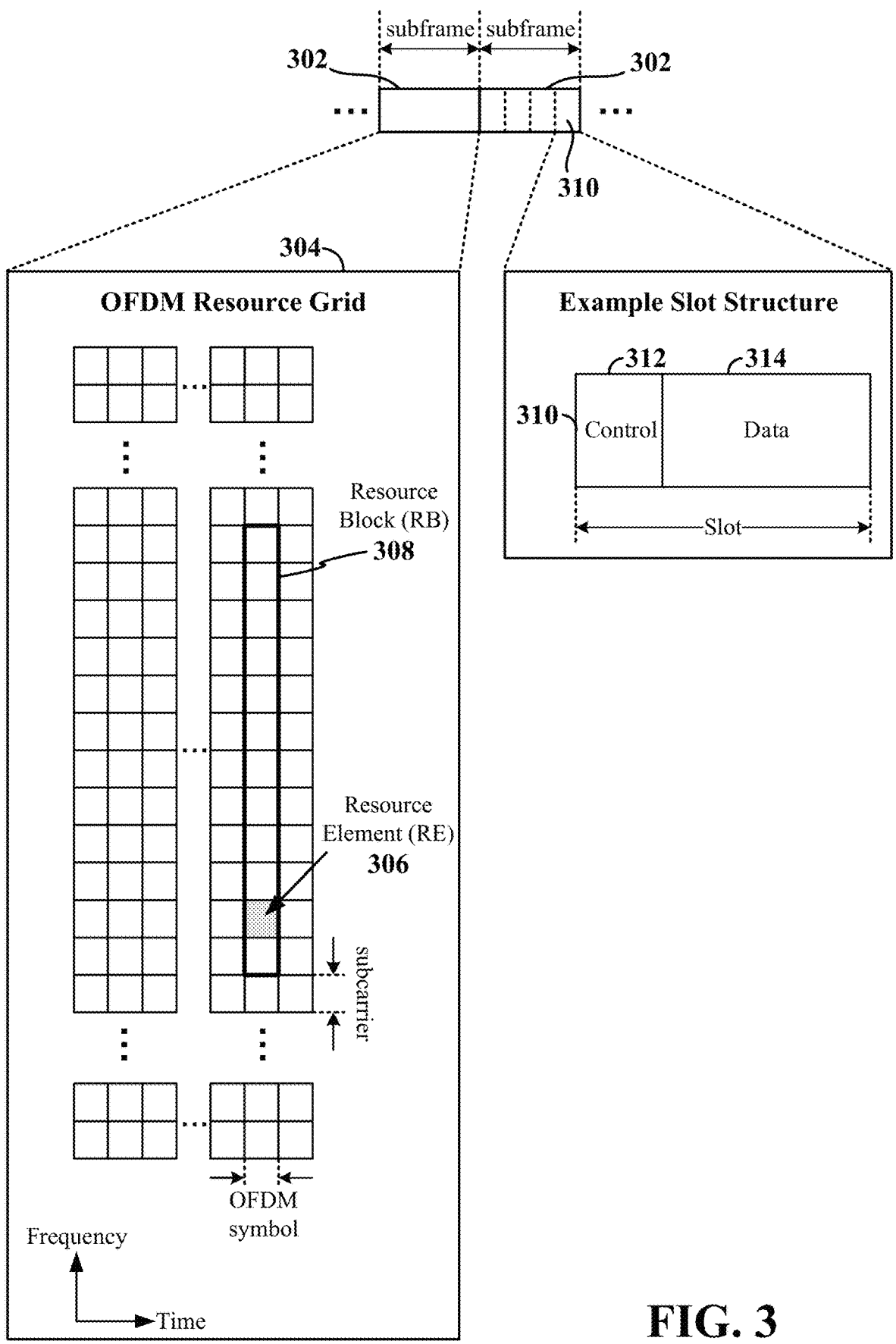
FIG. 3 is an expanded view of an exemplary subframe, showing an orthogonal frequency divisional multiplexing (OFDM) resource grid according to some aspects of the disclosure.

Referring now to FIG. 3, an expanded view of an exemplary subframe 302 is illustrated, showing an OFDM resource grid according to some aspects of the disclosure. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data. Such data may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information (e.g., a quantity of the bits of information), may be a controlled parameter, based on the modulation and coding scheme (MCS) and the number of RBs in a given transmission.

The channels or carriers illustrated in FIGS. 1, 2, and 3 are not necessarily all of the channels or carriers that may be utilized between devices, and those of ordinary skill in the art will recognize that other channels or carriers may be utilized in addition to those illustrated, such as other traffic, control, and feedback channels.

New technologies, like FR2 NR uplink carrier aggregation (UL-CA), enable the use of relatively large bandwidths and high data rates. However, a network may not automatically grant a maximum number of component carriers in response to every resource request from a given UE. Instead, and by way of example, the network may rely on buffer status reports (BSRs) received from the given UE as one factor to consider when determining whether to enable a plurality of component carriers (CCs) and, hence, enable scheduling across carriers for the given UE. BSRs may be short (5 bits in length) or long (8 bits in length). A short BSR may report to the network an amount of data stored in a buffer for any one logical channel group by including, in the BSR, one index number value out of a total of 32 index number values. The short BSR index number values range from Index 0 (representing 0 bytes of data in a given LCG buffer) to Index 31 (representing 0.15 Mbytes of data in the given LCG buffer). The long BSR index number values range from Index 0 (representing 0 bytes of data in a given LCG buffer) to Index 254 (representing 81 Mbytes of data in the given LCG buffer). Although the 8 bits of a long BSR occupy more resources than the 5 bits of a short BSR, the long BSR provides more information at a finer level of granularity in comparison to the short BSR. Table I, below, presents buffer size levels (e.g., buffer size values in bytes) for a 5-bit short buffer size field. Table II, below, presents buffer size levels (e.g., buffer size values in bytes) for an 8-bit long buffer size field.

TABLE I

| Index | BS Value |
|---|---|
| 0 | 0 |
| 1 | ≤10 |
| 2 | ≤14 |
| 3 | ≤20 |
| 4 | ≤28 |
| 5 | ≤38 |
| 6 | ≤53 |
| 7 | ≤74 |
| 8 | ≤102 |
| 9 | ≤142 |
| 10 | ≤198 |
| 11 | ≤276 |
| 12 | ≤384 |
| 13 | ≤535 |
| 14 | ≤745 |
| 15 | ≤1038 |
| 16 | ≤1446 |
| 17 | ≤2014 |
| 18 | ≤2806 |
| 19 | ≤3909 |
| 20 | ≤5446 |
| 21 | ≤7587 |
| 22 | ≤10570 |
| 23 | ≤14726 |
| 24 | ≤20516 |
| 25 | ≤28518 |
| 26 | ≤39818 |
| 27 | ≤55474 |
| 28 | ≤77284 |
| 29 | ≤107669 |
| 30 | ≤150000 |
| 31 | >150000 |

TABLE II

| Index | BS value |
|---|---|
| 0 | 0 |
| 1 | ≤10 |
| 2 | ≤11 |
| 3 | ≤12 |
| 4 | ≤13 |
| 5 | ≤14 |
| 6 | ≤15 |
| 7 | ≤16 |
| 8 | ≤17 |
| 9 | ≤18 |
| 10 | ≤19 |
| 11 | ≤20 |
| 12 | ≤22 |
| 13 | ≤23 |
| 14 | ≤25 |
| 15 | ≤26 |
| 16 | ≤28 |
| 17 | ≤30 |
| 18 | ≤32 |
| 19 | ≤34 |
| 20 | ≤36 |
| 21 | ≤38 |
| 22 | ≤40 |
| 23 | ≤43 |
| 24 | ≤46 |
| 25 | ≤49 |
| 26 | ≤52 |
| 27 | ≤55 |
| 28 | ≤59 |
| 29 | ≤62 |
| 30 | ≤66 |
| 31 | ≤71 |
| 32 | ≤75 |
| 33 | ≤80 |
| 34 | ≤85 |
| 35 | ≤91 |
| 36 | ≤97 |
| 37 | ≤103 |
| 38 | ≤110 |
| 39 | ≤117 |
| 40 | ≤124 |
| 41 | ≤132 |
| 42 | ≤141 |
| 43 | ≤150 |
| 44 | ≤160 |
| 45 | ≤170 |
| 46 | ≤181 |
| 47 | ≤193 |
| 48 | ≤205 |
| 49 | ≤218 |
| 50 | ≤233 |
| 51 | ≤248 |
| 52 | ≤264 |
| 53 | ≤281 |
| 54 | ≤299 |
| 55 | ≤318 |
| 56 | ≤339 |
| 57 | ≤361 |
| 58 | ≤384 |
| 59 | ≤409 |
| 60 | ≤436 |
| 61 | ≤464 |
| 62 | ≤494 |
| 63 | ≤526 |
| 64 | ≤560 |
| 65 | ≤597 |
| 66 | ≤635 |
| 67 | ≤677 |
| 68 | ≤720 |
| 69 | ≤767 |
| 70 | ≤817 |
| 71 | ≤870 |
| 72 | ≤926 |
| 73 | ≤987 |
| 74 | ≤1051 |
| 75 | ≤1119 |
| 76 | ≤1191 |
| 77 | ≤1269 |
| 78 | ≤1351 |
| 79 | ≤1439 |
| 80 | ≤1532 |
| 81 | ≤1631 |
| 82 | ≤1737 |
| 83 | ≤1850 |
| 84 | ≤1970 |
| 85 | ≤2098 |
| 86 | ≤2234 |
| 87 | ≤2379 |
| 88 | ≤2533 |
| 89 | ≤2698 |
| 90 | ≤2873 |
| 91 | ≤3059 |
| 92 | ≤3258 |
| 93 | ≤3469 |
| 94 | ≤3694 |
| 95 | ≤3934 |
| 96 | ≤4189 |
| 97 | ≤4461 |
| 98 | ≤4751 |
| 99 | ≤5059 |
| 100 | ≤5387 |
| 101 | ≤5737 |
| 102 | ≤6109 |
| 103 | ≤6506 |
| 104 | ≤6928 |
| 105 | ≤7378 |
| 106 | ≤7857 |
| 107 | ≤8367 |
| 108 | ≤8910 |
| 109 | ≤9488 |
| 110 | ≤10104 |
| 111 | ≤10760 |
| 112 | ≤11458 |

TABLE II-continued

| Index | BS value |
|---|---|
| 113 | ≤12202 |
| 114 | ≤12994 |
| 115 | ≤13838 |
| 116 | ≤14736 |
| 117 | ≤15692 |
| 118 | ≤16711 |
| 119 | ≤17795 |
| 120 | ≤18951 |
| 121 | ≤20181 |
| 122 | ≤21491 |
| 123 | ≤22885 |
| 124 | ≤24371 |
| 125 | ≤25953 |
| 126 | ≤27638 |
| 127 | ≤29431 |
| 128 | ≤31342 |
| 129 | ≤33376 |
| 130 | ≤35543 |
| 131 | ≤37850 |
| 132 | ≤40307 |
| 133 | ≤42923 |
| 134 | ≤45709 |
| 135 | ≤48676 |
| 136 | ≤51836 |
| 137 | ≤55200 |
| 138 | ≤58784 |
| 139 | ≤62599 |
| 140 | ≤66663 |
| 141 | ≤70990 |
| 142 | ≤75598 |
| 143 | ≤80505 |
| 144 | ≤85730 |
| 145 | ≤91295 |
| 146 | ≤97221 |
| 147 | ≤103532 |
| 148 | ≤110252 |
| 149 | ≤117409 |
| 150 | ≤125030 |
| 151 | ≤133146 |
| 152 | ≤141789 |
| 153 | ≤150992 |
| 154 | ≤160793 |
| 155 | ≤171231 |
| 156 | ≤182345 |
| 157 | ≤194182 |
| 158 | ≤206786 |
| 159 | ≤220209 |
| 160 | ≤234503 |
| 161 | ≤249725 |
| 162 | ≤265935 |
| 163 | ≤283197 |
| 164 | ≤301579 |
| 165 | ≤321155 |
| 166 | ≤342002 |
| 167 | ≤364202 |
| 168 | ≤387842 |
| 169 | ≤413018 |
| 170 | ≤439827 |
| 171 | ≤468377 |
| 172 | ≤498780 |
| 173 | ≤531156 |
| 174 | ≤565634 |
| 175 | ≤602350 |
| 176 | ≤641449 |
| 177 | ≤683087 |
| 178 | ≤727427 |
| 179 | ≤774645 |
| 180 | ≤824928 |
| 181 | ≤878475 |
| 182 | ≤935498 |
| 183 | ≤996222 |
| 184 | ≤1060888 |
| 185 | ≤1129752 |
| 186 | ≤1203085 |
| 187 | ≤1281179 |
| 188 | ≤1364342 |
| 189 | ≤1452903 |
| 190 | ≤1547213 |
| 191 | ≤1647644 |
| 192 | ≤1754595 |
| 193 | ≤1868488 |
| 194 | ≤1989774 |
| 195 | ≤2118933 |
| 196 | ≤2256475 |
| 197 | ≤2402946 |
| 198 | ≤2558924 |
| 199 | ≤2725027 |
| 200 | ≤2901912 |
| 201 | ≤3090279 |
| 202 | ≤3290873 |
| 203 | ≤3504487 |
| 204 | ≤3731968 |
| 205 | ≤3974215 |
| 206 | ≤4232186 |
| 207 | ≤4506902 |
| 208 | ≤4799451 |
| 209 | ≤5110989 |
| 210 | ≤5442750 |
| 211 | ≤5796046 |
| 212 | ≤6172275 |
| 213 | ≤6572925 |
| 214 | ≤6999582 |
| 215 | ≤7453933 |
| 216 | ≤7937777 |
| 217 | ≤8453028 |
| 218 | ≤9001725 |
| 219 | ≤9586039 |
| 220 | ≤10208280 |
| 221 | ≤10870913 |
| 222 | ≤11576557 |
| 223 | ≤12328006 |
| 224 | ≤13128233 |
| 225 | ≤13980403 |
| 226 | ≤14887889 |
| 227 | ≤15854280 |
| 228 | ≤16883401 |
| 229 | ≤17979324 |
| 230 | ≤19146385 |
| 231 | ≤20389201 |
| 232 | ≤21712690 |
| 233 | ≤23122088 |
| 234 | ≤24622972 |
| 235 | ≤26221280 |
| 236 | ≤27923336 |
| 237 | ≤29735875 |
| 238 | ≤31666069 |
| 239 | ≤33721553 |
| 240 | ≤35910462 |
| 241 | ≤38241455 |
| 242 | ≤40723756 |
| 243 | ≤43367187 |
| 244 | ≤46182206 |
| 245 | ≤49179951 |
| 246 | ≤52372284 |
| 247 | ≤55771835 |
| 248 | ≤59392055 |
| 249 | ≤63247269 |
| 250 | ≤67352729 |
| 251 | ≤71724679 |
| 252 | ≤76380419 |
| 253 | ≤81338368 |
| 254 | >81338368 |
| 255 | Reserved |

Buffer status reporting is currently undertaken by a MAC entity of a given UE. According to current practice, a determination as to whether to report a short or a long BSR is based on the number of LCGs that have data available for transmission when the MAC PDU containing the BSR is to be built (e.g., generated). Specifically, for regular and periodic BSRs, if more than one LCG has data available for transmission when the MAC PDU containing the BSR is to be built, the MAC entity reports (e.g., sends, transmits) a long BSR for all LCGs that have data available for transmission. Otherwise, (i.e., if only one LCG has data available for transmission when the MAC PDU containing the BSR is to be built) the MAC entity is to report a short BSR.

The current practice may lead to situations where a given UE is configured with a sub-optimal configuration. Some examples of a sub-optimal configuration include, but are not limited to, a lower bandwidth than may otherwise be available, a single component carrier when additional component carriers may be available, or a manner of scheduling that does not change in response to a type, priority, or amount of data to be conveyed in the uplink direction (also referred to as invariable scheduling). The preceding list was exemplary and non-limiting. Sub-optimal configurations may occur when a UE reports a short BSR and a network takes an undesirable amount of time (e.g., a relatively long time given, for example, a type or priority of data to be conveyed in the uplink direction) to react to the short BSR, and delays activation of component carriers that the UE may use to relatively rapidly transmit the data awaiting upload in its buffer(s). In this example of a delay and other examples that are within the scope of this disclosure, the network's delay in activating additional component carriers may negatively impact trunking efficiency gain. On the other hand, the content of the short BSR may inform the network that a decision not to activate additional (or all available component carriers) is a valid decision where, in a given set of circumstances, a single component carrier is sufficient to carry the accumulated and awaiting data, according to a known maximum component carrier channel capacity. By way of example, a network's decision not to add component carriers may result in reduced waste of resources. The decision may, for example, reduce padding data that might otherwise be used to fill potentially unused resources (of the additional component carriers).

According to various aspects of the disclosure, techniques for BSR reporting with a relaxed LCG requirement are described herein. The current LCG requirement necessitates that if more than one LCG has data available for transmission when the MAC PDU containing the BSR is to be built, a MAC entity of a UE is to report (e.g., send) a long BSR for all of the LCGs that have the data available for transmission. Thus, the LCG requirement effectively prohibits the use of a long BSR when only one LCG has data available for transmission at the time when the MAC PDU containing the BSR is to be built. The LCG requirement may, for example and without limitation, negatively impact BSR reporting in use cases involving customer premise equipment (CPE). For example, in CPE use cases, it is expected that only one LCG will be configured since a CPE traffic profile may be data-centric for enterprise applications, for example. The CPE use cases may be compared to smartphone use cases, where smartphones (e.g., smartphone-like UEs) may have Voice (e.g., voice over New Radio (VONR)) plus Data and other applications running in parallel. Relaxation of the LCG requirement may optimize, for example, a network's activation of uplink component carriers and improve the network's performance, for example, by optimizing the network's scheduling and use of resources.

Figure 4:
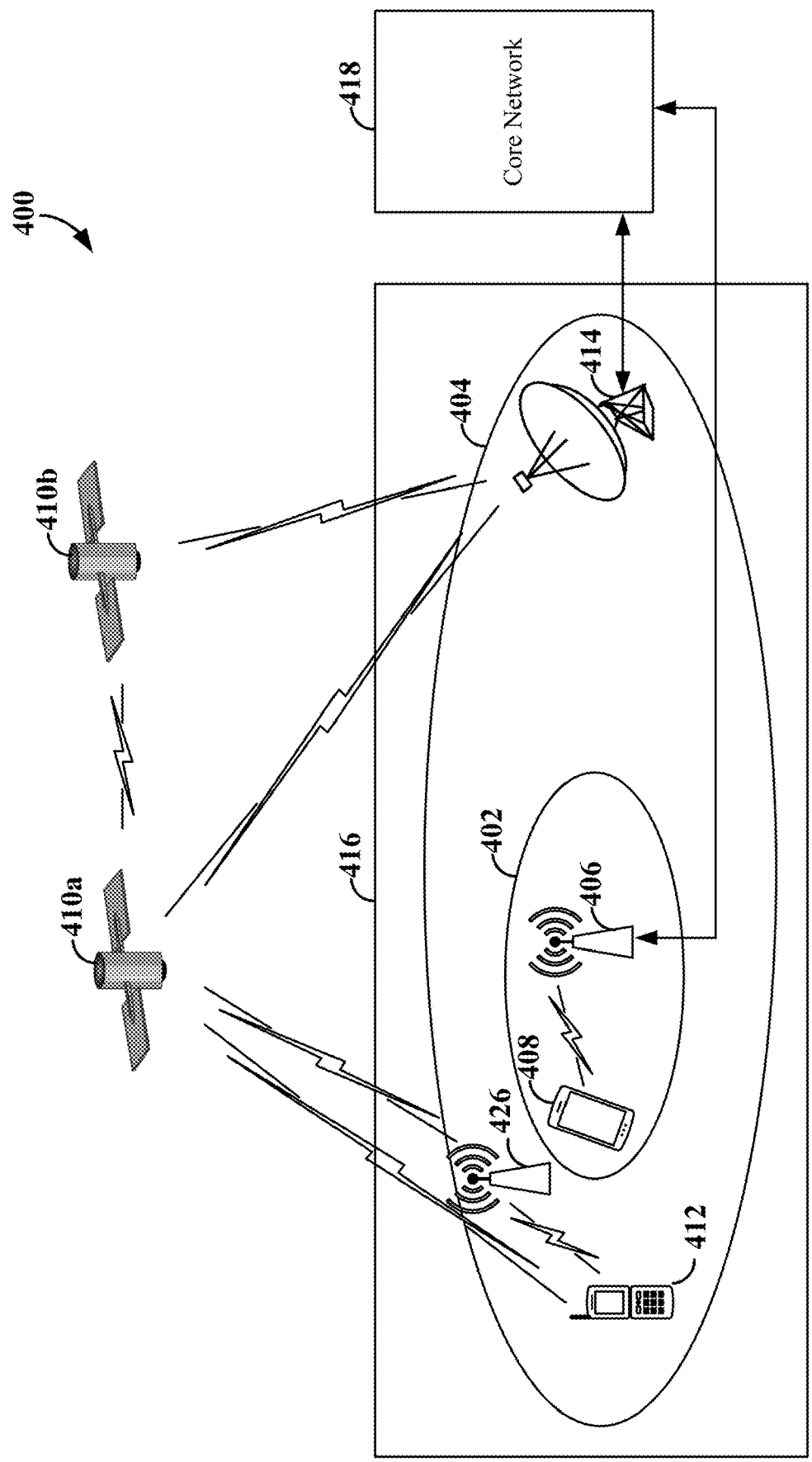
FIG. 4 is a conceptual illustration of an example of a wireless communication system including terrestrial and non-terrestrial radio access networks (RANs).

FIG. 4 illustrates an example of a wireless communication system 400, including a terrestrial RAN 402 and a non-terrestrial RAN 404 (e.g., a non-terrestrial network (NTN)). The wireless communication system 400 may be a 5G wireless communication system (5GS), which may correspond to, for example, the wireless communication system 100 illustrated in FIG. 1. The terrestrial RAN 402 may correspond, for example, to the RAN 200 illustrated in FIG. 2. Each of the terrestrial RAN 402 and the non-terrestrial RAN 404 may be associated with a respective geographical area. Thus, each of the terrestrial RAN 402 and the non-terrestrial RAN 404 may provide 5G services within the corresponding respective geographical area. For example, the terrestrial RAN 402 may include one or more base stations 406 (one of which is shown for convenience), each serving one or more wireless communication devices 408. The terrestrial RAN 402 may further be coupled to a core network (CN) 418 for communication of user plane and control plane signaling and data.

In some examples, the non-terrestrial RAN 404 may include one or more terrestrial base stations 426, one of which is shown for convenience, and the satellite 410a may provide a backhaul link to the core network 418. In this example, the non-terrestrial network 404 includes both terrestrial and non-terrestrial RAN components. The non-terrestrial RAN 404 further includes a satellite gateway 414 (or Earth station) to relay control plane and user plane communication between the satellite 410a and the core network 418. In some examples, the satellite 410a may route communications to/from the satellite gateway 414 through one or more additional satellites 410b via inter-satellite links (ISLs).

According to some aspects, the non-terrestrial RAN 404 may include a satellite 410a operating as a base station (e.g., gNB) to serve one or more UEs 412 within a satellite coverage area. The satellite gateway or another terrestrial entity may serve as the base station according to other aspects. In some examples, the satellite coverage area may include one or more fixed tracking areas (TAs), each including one or more cells (not shown) served by the satellite 410a. Each cell may be defined with respect to a fixed or moving satellite beam spot, depending on the type of satellite. For example, the satellite 410a may be a low earth orbit (LEO) satellite, a medium earth orbit (MEO) satellite, a geostationary earth orbit (GEO) satellite, or a highly elliptical orbit (HEO). By way of example, LEO satellites may orbit the Earth with an altitude between 300 kilometers (km) and 2,000 km and produce a beam footprint size between 100 km and 500 km MEO satellites may orbit the Earth at an altitude between 8,000 km and 25,000 km and produce a beam footprint size between 100 km and 500 km GEO satellites may orbit the Earth at an altitude of 35,786 km and produce a beam footprint size between 200 and 1,000 km. NTNs are not limited to spaceborne vehicles (e.g., satellites). According to some examples, NTNs may include networks, or segments of networks, using an airborne or spaceborne vehicle for transmission. Airborne vehicles may include high altitude platforms (HAPs) encompassing unmanned aircraft systems (UAS) (similar to UAV 220). By way of example, UASs may include but are not limited to tethered (e.g., quasi-stationary) UAS, lighter-than-air UAS, and heavier-than-air UAS.

Communication via the non-terrestrial RAN 404 may be referred to as NTN communication. A round trip time, including propagation delays, between the wireless communication device 412, one or more satellites (e.g., satellite 410a, satellite 410b), and the satellite gateway 414 will be greater than the round-trip time between the wireless communication device 412 and a relatively nearby terrestrial base station 426. The round-trip time (e.g., as an indicator of latency) may be considered by the wireless communication device 412 in selecting to transmit a short or long BSR. In the example of NTN communication, a long BSR may provide a base station (e.g., located in the satellite 410a or at the satellite gateway 414) with a better estimate of the amount of data awaiting uplink transmission than a short BSR. A better estimate of the amount of data pending uplink transmission may inform the base station concerning the base station's decision regarding a scheduling rate to utilize in connection with the wireless communication device 412. A better estimate of the amount of data pending uplink transmission (obtained via the long BSR), and an increased probability of obtaining a scheduling rate commensurate with the amount of data pending uplink transmission, may improve the overall communication quality of a user application. Having higher granular BSRs (e.g., in scenarios that may include NTN communication) may help overcome propagation delays and other delays that contribute to latency and may help to provide for a scheduling pattern that may improve the overall quality of the communication of a user application as well as an improved user experience.

Figure 5:
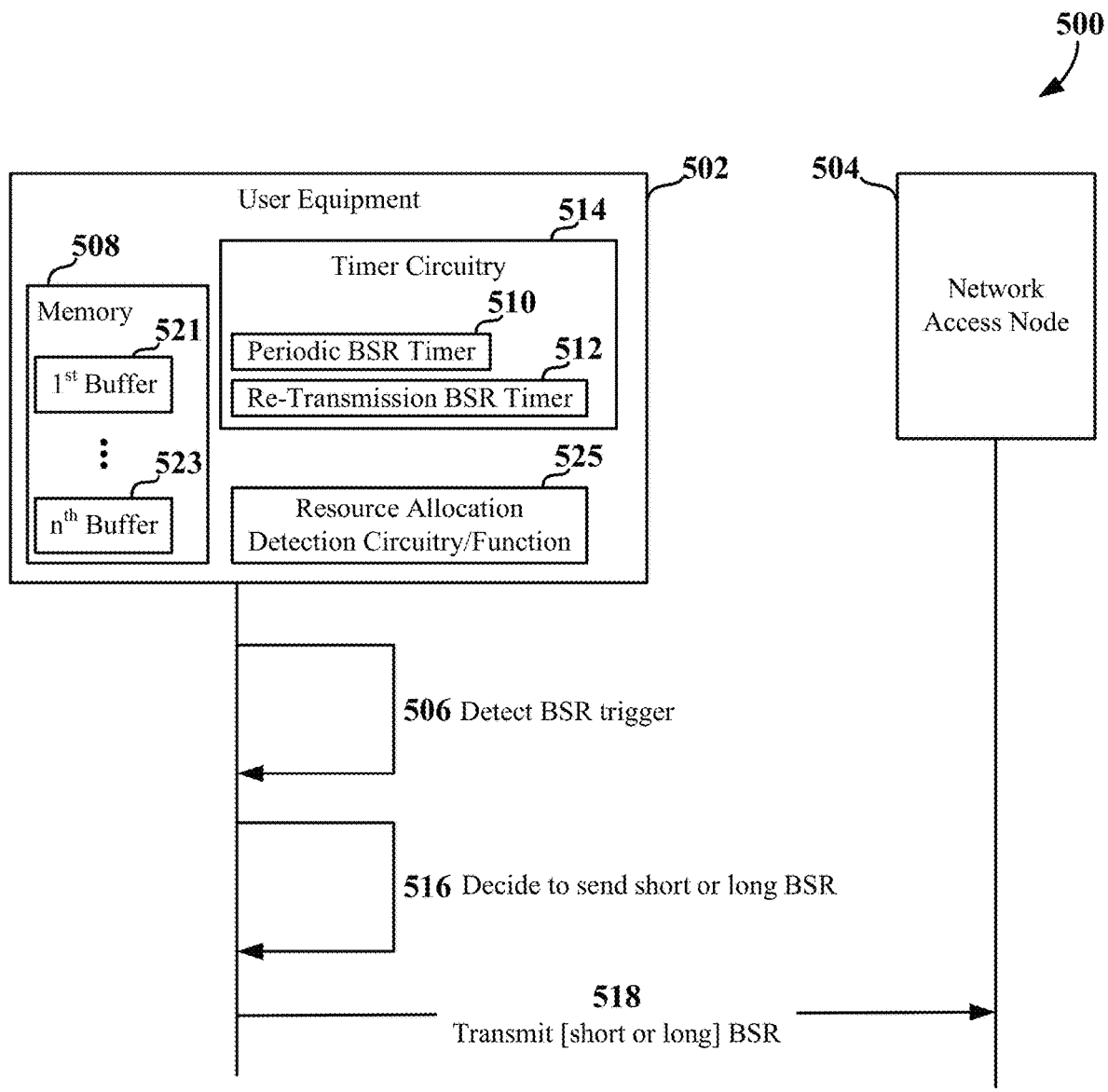
FIG. 5 is a call flow diagram illustrating communication between a user equipment (UE) and a network access node according to some aspects of the disclosure.

FIG. 5 is a call flow diagram 500 illustrating communication between a user equipment 502 and a network access node 504 according to some aspects of the disclosure. The user equipment 502 may be any user equipment or scheduled entity as shown and described, for example, in connection with FIGS. 1, 2, and/or 4. The network access node 504 may be any scheduling entity, network access node, or base station as shown and described, for example, in connection with FIGS. 1, 2, and/or 4. In some examples, the network access node 504 may be implemented as an aggregated base station or a disaggregated base station. In a disaggregated base station architecture, the network access node may include one or more of a central unit (CU), a distributed unit (DU), or a radio unit (RU).

In the example shown in FIG. 5, the UE 502 may buffer (e.g., accumulate and temporarily store) data in any of a $1^{st}$ buffer 521 to an $n^{th}$ buffer 523, where n is a positive integer, such as 4, 8, or another integer). The data may be associated with a logical channel group (LCG). One LCG may be a collection of logical channels/resource blocks (LCs/RBs). Each RB may have its own buffer. In one example, all signaling radio bearers (SRBs) may be part of one LCG. A first data radio bearer (DRB) and a second DRB may be another LCG; a third DRB may be another LCG. An LCG BSR reports a sum of all the data pending on associated radio bearers. In some examples, the UE 502 may have more than one LCG, and the $1^{st}$ buffer 521 to the $n^{th}$ buffer 523 may store data associated with a respective LCG of the more than one LCG. The $1^{st}$ buffer 521 to the $n^{th}$ buffer 523 may be located, for example, in a memory 508 of the UE 502.

As shown in FIG. 5, the UE 502 may detect a BSR trigger 506. The BSR trigger 506 may be any event or occurrence that triggers the transmission (e.g., the reporting, the sending) of a BSR by the UE 502. In one example, the BSR trigger 506 may be associated with resource allocations for uplink data. For example, a BSR may be triggered when a resource allocation detection circuitry/function 515 determines that resources are allocated for a given LCG; however, either no data is available for the given LCG or the data that is available for uplink transmission belongs to a different LCG with a higher priority than that of the given LCG.

In another example, the UE may detect the BSR trigger 506 based on expiration of a periodic BSR timer 510 with data to be transmitted remaining in a buffer associated with the given LCG. The periodic BSR timer 510 may reside in timer circuitry 514 of the UE 502. For example, the UE 502 may start the periodic BSR timer 510 when the UE 502 transmits a previous BSR. A next BSR may be triggered in response to the expiration of the periodic BSR timer 510 and an accumulation of data in a respective buffer (e.g., any of the $1^{st}$ buffer 521 to the $n^{th}$ buffer 523), where the data accumulated during the time between transmission of the previous BSR and the expiration of the periodic BSR timer 510.

In another example, the UE 502 may detect the BSR trigger 506 based on the expiration of a re-transmission BSR timer 512 with data to be transmitted remaining in a buffer associated with the given LCG. The re-transmission BSR timer 512 may reside in the timer circuitry 514 of the UE 502. For example, the UE 502 may start the re-transmission BSR timer 512 when the UE 502 transmits a first BSR, and the UE 502 may stop and reset the re-transmission BSR timer 512 based on, for example, receiving an uplink grant from the network access node 504 in response the transmission of the first BSR. The re-transmission BSR timer 512 may trigger the UE 502 to re-transmit the BSR if the re-transmission BSR timer 512 expires before the UE 502 receives an uplink grant.

In some examples, if the UE 502 detects the BSR trigger 506 by, for example, detecting the allocation of resources, the expiration of the periodic BSR timer 510, or the expiration of the re-transmission BSR timer 512, all as exemplified above, the UE 502 may decide to report (e.g., send) a short or a long BSR 516. The decision may be presently based on whether one, or more than one, LCG has data available for transmission, when a MAC PDU containing the BSR is to be built.

According to some aspects, if more than one LCG has data available for transmission when the MAC PDU containing the BSR is to be built, then at 518, the UE 502 may report a long BSR for all LCGs that have data available for transmission. However, if only one LCG has data available for transmission when the MAC PDU containing the BSR is to be built, then, at 518, the UE 502 may report a short BSR for that only one LCG.

For example, in a case in which the UE 502 detects the BSR trigger 506, and the UE 502 determines that a single LCG of the UE 502 has data to be transmitted (e.g., data in the $1^{st}$ buffer 521 associated with a LCG), the UE 502 may determine to transmit the short BSR associated with the LCG (to report an amount of data ready for uplink transmission that is associated with the LCG).

According to some aspects herein, as an alternative to deciding to send a short BSR or a long BSR based on a quantity of LCGs having data awaiting upload at the time a MAC PDU containing the BSR is built, a UE (e.g., a MAC entity of a UE) may determine to send a long BSR or a short BSR based on a comparison of a decision-point value to a threshold value. The decision-point value may be a metric. In the examples provided herein, the decision-point value may be a buffer status report (BSR)-type determinative value. In some examples, the BSR-type determinative value may be based on respective values assigned to at least one of: a peak power envelope of the wireless communication device, a data transmission rate historically obtained by the wireless communication device, a number of component carriers available to be scheduled for a complete upload of a buffer holding data (e.g., where the number corresponds to a quantity), a cost function, an amount of data associated with the logical channel group that is pending the uplink transmission, a type of the wireless communication device, or a latency of communications of the wireless communication device. For example, the UE may send, for the LCG having a quantity of data pending an uplink transmission, a long buffer status report in response to the decision-point value exceeding the threshold value. Alternatively, the UE may send, for the LCG, a short buffer status report in response to the decision-point value being equal to or less than the threshold value.

Figure 6:
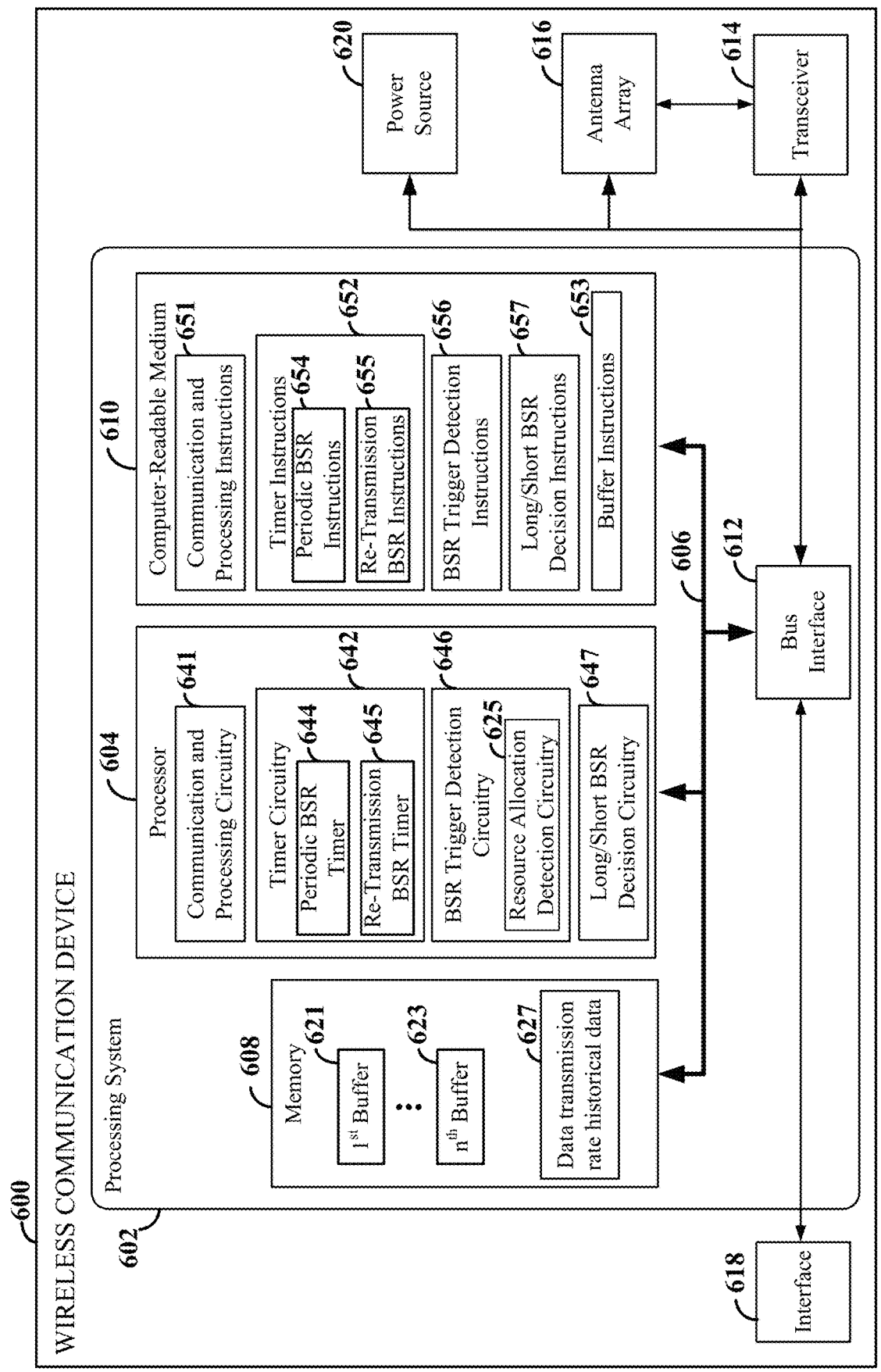
FIG. 6 is a block diagram illustrating an example of a hardware implementation of a wireless communication device (e.g., a UE) employing a processing system according to some aspects of the disclosure.

FIG. 6 is a block diagram illustrating an example of a hardware implementation of a wireless communication device 600 (e.g., a UE) employing a processing system 602 according to some aspects of the disclosure. The wireless communication device 600 may be a scheduled entity (e.g., a UE) as illustrated in any one or more of FIGS. 1, 2, 4, and/or 5.

In accordance with various aspects of the disclosure, an element, or any portion of an element, or any combination of elements may be implemented with a processing system 602 that includes one or more processors, such as processor 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 600 may be configured to perform any one or more of the functions described herein. That is, the processor 604, as utilized in the wireless communication device 600, may be used to implement any one or more of the methods or processes described and illustrated, for example, in any one or more of FIGS. 4, 5, and/or 7.

The processor 604 may, in some examples, be implemented via a baseband or modem chip and in other implementations, the processor 604 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 602 may be implemented with a bus architecture, represented generally by the bus 606. The bus 606 may include any number of interconnecting buses and bridges depending on the specific application of the processing system 602 and the overall design constraints. The bus 606 communicatively couples together various circuits, including one or more processors (represented generally by the processor 604), a memory 608, and computer-readable media (represented generally by the computer-readable medium 610). The bus 606 may also link various other circuits such as timing sources, peripherals, voltage regulators, and power management circuits, which are well known in the art, and therefore, will not be described any further.

A bus interface 612 provides an interface between the bus 606 and a transceiver 614. The transceiver 614 may be a wireless transceiver. The transceiver 614 may provide a means for communicating with various other apparatus over a transmission medium (e.g., air interface). The transceiver 614 may further be coupled to one or more antenna arrays (hereinafter antenna array 616). The bus interface 612 further provides an interface between the bus 606 and a user interface 618 (e.g., keypad, display, touch screen, speaker, microphone, control features, etc.). Of course, such a user interface 618 is optional and may be omitted in some examples. In addition, the bus interface 612 further provides an interface between the bus 606 and a power source 620 of the wireless communication device 600.

The processor 604 is responsible for managing the bus 606 and general processing, including the execution of software stored on the computer-readable medium 610. The software, when executed by the processor 604, causes the processing system 602 to perform the various functions described below for any particular apparatus. The computer-readable medium 610 and the memory 608 may also be used for storing data that is manipulated by the processor 604 when executing software. The data may include data in any of a $1^{st}$ buffer 621 to an $n^{th}$ buffer 623 and/or data in a collection of data transmission rate historical data 627 described herein according to some aspects of the disclosure.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 610. When executed by the processor 604, the software may cause the processing system 602 to perform the various processes and functions described herein for any particular apparatus.

The computer-readable medium 610 may be a non-transitory computer-readable medium and may be referred to as a computer-readable storage medium or a non-transitory computer-readable medium. The non-transitory computer-readable medium may store computer-executable code (e.g., processor-executable code). The computer-executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 610 may reside in the processing system 602, external to the processing system 602, or distributed across multiple entities including the processing system 602. The computer-readable medium 610 may be embodied in a computer program product or article of manufacture. By way of example, a computer program product or article of manufacture may include a computer-readable medium in packaging materials. In some examples, the computer-readable medium 610 may be part of the memory 608. Those skilled in the art will recognize how best to implement the described functionality presented throughout this disclosure depending on the particular application and the overall design constraints imposed on the overall system.

In some aspects of the disclosure, the processor 604 may include communication and processing circuitry 641 configured for various functions, including, for example, communicating with other wireless communication devices (e.g., a scheduling entity, a scheduled entity), a network core (e.g., a 5G core network), or any other entity, such as, for example, local infrastructure or an entity communicating with the wireless communication device 600 via the Internet, such as a network provider. In some examples, the communication and processing circuitry 641 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 641 may include one or more transmit/receive chains.

In some implementations where the communication involves receiving information, the communication and processing circuitry 641 may obtain or identify information from a component of the wireless communication device 600 (e.g., from the transceiver 614 that receives the information via radio frequency signaling or some other type of signaling suitable for the applicable communication medium), process (e.g., decode) the information, and output the processed information. For example, the communication and processing circuitry 641 may output the information to another component of the processor 604, to the memory 608, or to the bus interface 612. In some examples, the communication and processing circuitry 641 may receive one or more of: signals, messages, other information, or any combination thereof. In some examples, the communication and processing circuitry 641 may receive information via one or more channels. In some examples, the communication and processing circuitry 641 may include functionality for a means for receiving. In some examples, the communication and processing circuitry 641 may include functionality for a means for processing, including a means for demodulating, a means for decoding, etc.

In some implementations where the communication involves sending (e.g., transmitting) information, the communication and processing circuitry 641 may obtain or identify information (e.g., from another component of the processor 604, the memory 608, or the bus interface 612), process (e.g., modulate, encode, etc.) the information, and output the processed information. For example, the communication and processing circuitry 641 may obtain data stored in the memory 608 and may process the obtained data according to some aspects of the disclosure.

In some examples, the communication and processing circuitry 641 may obtain information and may output the information to the transceiver 614 (e.g., that transmits the information via radio frequency signaling or some other type of signaling suitable for the applicable communication medium). In some examples, the communication and processing circuitry 641 may send one or more of signals, messages, other information, or any combination thereof. In some examples, the communication and processing circuitry 641 may send information via one or more channels. In some examples, the communication and processing circuitry 641 may include functionality for a means for sending (e.g., a means for transmitting). In some examples, the communication and processing circuitry 641 may include functionality for a means for generating, including a means for modulating, a means for encoding, etc. In some examples, the communication and processing circuitry 641 may be configured to receive and process uplink traffic and uplink control messages (e.g., similar to uplink traffic 116 and uplink control 118 of FIG. 1) and process and transmit downlink traffic and downlink control messages (e.g., similar to downlink traffic 112 and downlink control 114 of FIG. 1) via the antenna array 616 and the transceiver 614.

The communication and processing circuitry 641 may further be configured to execute communication and processing instructions 651 (e.g., software) stored on the computer-readable medium 610 to implement one or more functions described herein.

In some aspects of the disclosure, the processor 604 may include one or more buffers, represented in FIG. 6 by the $1^{st}$ buffer 621 to the $n^{th}$ buffer 623 associated with the memory 608. Of course, the $1^{st}$ buffer 621 to the $n^{th}$ buffer 623 is not limited to being associated with the memory 608; other locations and components may either perform the function of the $1^{st}$ buffer 621 to the $n^{th}$ buffer 623 or incorporate the $1^{st}$ buffer 621 to the $n^{th}$ buffer 623. The $1^{st}$ buffer 621 to the $n^{th}$ buffer 623 may accumulate and store (e.g., temporarily) data awaiting uplink transmission. The data may be grouped according to logical channels. Accordingly, the $1^{st}$ buffer 621 to the $n^{th}$ buffer 623 may accumulate and store data for respective logical channel groups of a plurality of logical channel groups. Although the $1^{st}$ buffer 621 to the $n^{th}$ buffer 623 may be under the control of the processing system 602, in some examples, the $1^{st}$ buffer 621 to the $n^{th}$ buffer 623 may be configured to execute buffer instructions 653 (e.g., software) stored on the computer-readable medium 610 to implement one or more functions described herein.

In some aspects of the disclosure, the processor 604 may include timer circuitry 642. The timer circuitry 642 may be configured for various functions, including, for example, setting, starting, stopping, resetting, and restarting various timers. The various timers may include, but are not limited to, a periodic BSR timer 644 and a re-transmission BSR timer 645. The periodic BSR timer 644 and the re-transmission BSR timer 645 may be similar to the periodic BSR timer 510 and the re-transmission BSR timer 512, both as shown and described in connection with FIG. 5. As these types of timers were described above in connection with FIG. 5, their descriptions will not be repeated for the sake of brevity. The timer circuitry 642 may be configured to execute timer instructions 652 (e.g., software) stored on the computer-readable medium 610 to implement one or more functions described herein. Although they may be responsive to the timer instructions 652 in general, according to some aspects, the periodic BSR timer 644 may be configured to execute periodic BSR timer instructions 654 (e.g., software) and the re-transmission BSR timer 645 may be configured to execute re-transmission BSR timer instructions 655 (e.g., software), all stored, for example, on the computer-readable medium 610 to implement one or more functions described herein.

In some aspects of the disclosure, the processor 604 may include BSR trigger detection circuitry 646. The BSR trigger detection circuitry 646 may be configured for various functions, including, for example, detecting values of various parameters, states of flags, and/or other indicia of an instruction to trigger a BSR report and/or begin (e.g., to start) a BSR timer of a given type. The BSR timer of the given type may be, for example, the periodic BSR timer 644 as shown and described above, the re-transmission BSR timer 645 as shown and described above, and/or any other timer that may be directly or indirectly associated with the generation and/or the transmission of a BSR. The BSR trigger detection circuitry 646 may include resource allocation detection circuitry 625, similar to resource allocation detection circuitry/function 525 of FIG. 5. The BSR trigger detection circuitry 646 may be utilized to detect a BSR trigger 506, as shown and described in connection with FIG. 5. As some exemplary types of BSR triggers and their detection were shown and described above in connection with FIG. 5, a further description of the BSR trigger detection circuitry 646 will be omitted for the sake of brevity. The BSR trigger detection circuitry 646 may be configured to execute BSR trigger detection instructions 656 (e.g., software) (which may include resource allocation detection instructions (not shown)) stored on the computer-readable medium 610 to implement one or more functions described herein.

In some aspects of the disclosure, the processor 604 may include long/short BSR decision circuitry 647. The long/short BSR decision circuitry 647 may be configured for various functions, including, for example, deciding whether to send, for a logical channel group having a quantity of data pending an uplink transmission, a long buffer status report in response to a decision-point value exceeding a threshold value, or to send, for the logical channel group, a short buffer status report in response to the decision-point value being equal to or less than the threshold value. According to some aspects, the decision-point value may be a buffer status report (BSR)-type determinative value. In some examples, the BSR-type determinative value may be based on respective values assigned to at least one of: a peak power envelope of the wireless communication device, a data transmission rate historically obtained by the wireless communication device, a number of component carriers available to be scheduled for a complete upload of a buffer holding data, a cost function, an amount of data associated with the logical channel group that is pending the uplink transmission, a type of the wireless communication device, or a latency of communications of the wireless communication device.

In some aspects, the long/short BSR decision circuitry 647 may work in conjunction with, for example, the communication and processing circuitry 641 to determine, for example, a respective value (e.g., a first respective value) that may be assigned to the peak power envelope of the wireless communication device.

In some aspects, the long/short BSR decision circuitry 647 may work in conjunction with, for example, the communication and processing circuitry 641 and the memory 608 to determine, for example, a respective value (e.g., a second respective value) assigned to the data transmission rate. As shown in FIG. 6, the memory 608 of the wireless communication device 600 may store data transmission rate historical data 627.

In some aspects, the long/short BSR decision circuitry 647 may work in conjunction with, for example, the communication and processing circuitry 641 to determine, for example, a respective value (e.g., a third respective value) assigned to the number of component carriers allocated or scheduled for the wireless communication device 600.

In some aspects, the long/short BSR decision circuitry 647 may work in conjunction with, for example, the communication and processing circuitry 641 to determine, for example, a respective value (e.g., a fourth respective value) assigned to the cost function. For example, a respective value assigned to the cost function may be obtained by a comparison of a first amount of power required to transmit the quantity of data utilizing a single component carrier having a first channel capacity to a second amount of power required to transmit the quantity of data in a plurality of component carriers having a collective channel capacity.

In some aspects, the long/short BSR decision circuitry 647 may work in conjunction with, for example, the communication and processing circuitry 641 to determine, for example, a respective value (e.g., a fifth respective value) assigned to the amount of data associated with the logical channel group.

In some aspects, the long/short BSR decision circuitry 647 may work in conjunction with, for example, the communication and processing circuitry 641 to determine, for example, a respective value (e.g., a sixth respective value) associated with the type of the wireless communication device.

In some aspects, the long/short BSR decision circuitry 647 may work in conjunction with, for example, the communication and processing circuitry 641 to determine, for example, a respective value (e.g., a seventh respective value) associated with a latency of communications of the wireless communication device.

In accordance with each of the aspects and examples provided above, the long/short BSR decision circuitry 647 may be configured to execute long/short BSR decision instructions 657 (e.g., software) stored on the computer-readable medium 610 to implement one or more functions described herein.

Figure 7:
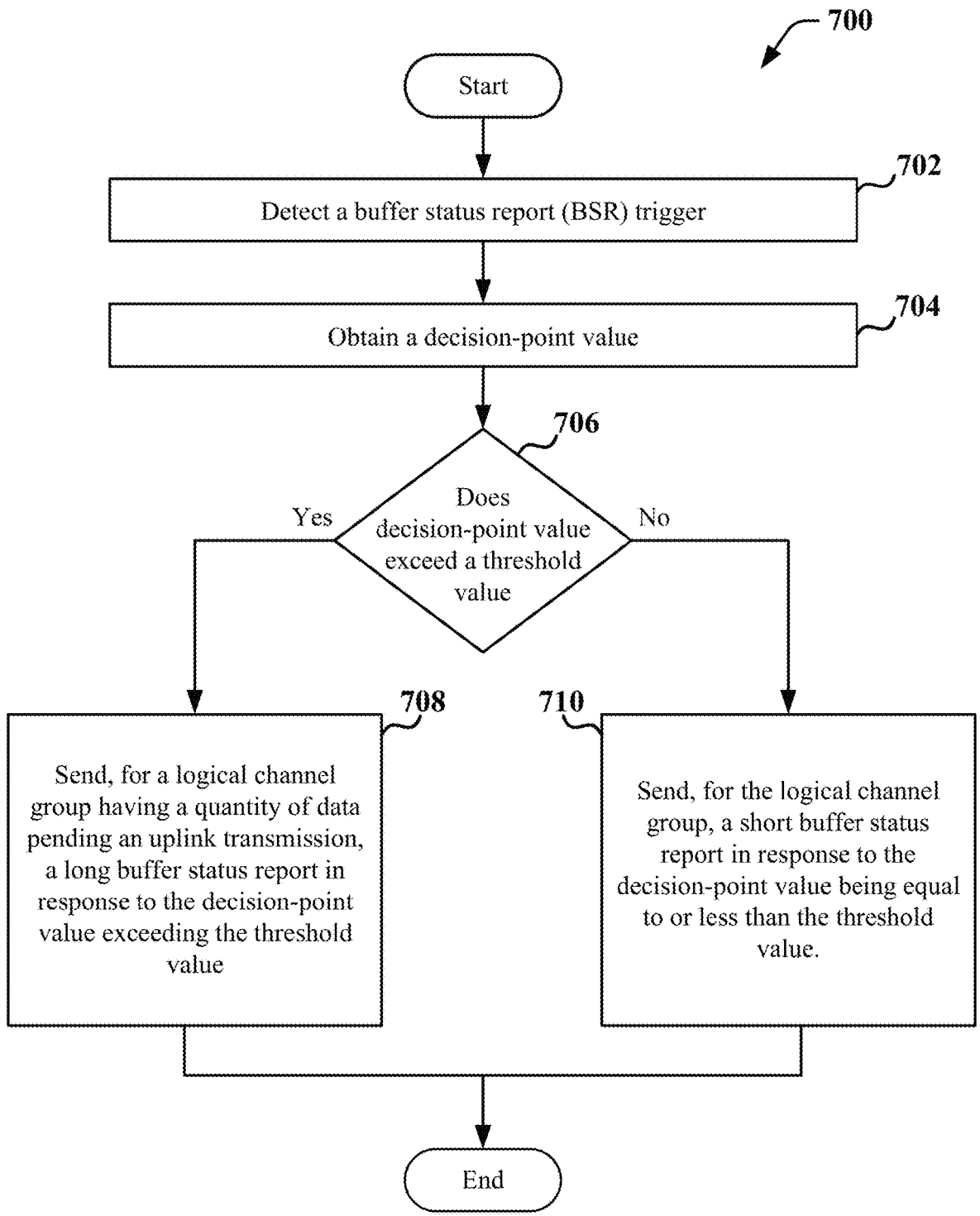
FIG. 7 is a flow chart illustrating an exemplary process at user equipment according to some aspects of the disclosure.

FIG. 7 is a flow chart illustrating an exemplary process 700 (e.g., a method of wireless communication) at a wireless communication device (e.g., at a scheduled entity, at a user equipment (UE)) according to some aspects of the disclosure. The process 700 may occur in a wireless communication network, such as the wireless communication networks of FIGS. 1, 2, 4, 5, and/or 6, for example. As described below, some or all illustrated features may be omitted in a particular implementation within the scope of the present disclosure, and some illustrated features may not be required for all implementations. In some examples, the process 700 may be carried out by the wireless communication device 600 described and illustrated in connection with FIG. 6. In some examples, the process 700 may be carried out by any suitable apparatus or means for carrying out the functions or algorithms described herein.

At block 702, the wireless communication device may detect a buffer status report trigger. For example, the BSR trigger detection circuitry 646, shown and described above in connection with FIG. 6, may provide a means for detecting a buffer status report trigger.

At block 704, the wireless communication device may obtain a decision-point value. According to some aspects, the decision-point value may be a buffer status report (BSR)-type determinative value. In some examples, the BSR-type determinative value may be based on respective values assigned to at least one of: a peak power envelope of the wireless communication device, a data transmission rate historically obtained by the wireless communication device, a number of component carriers available to be scheduled for a complete upload of a buffer holding data, a cost function, an amount of data associated with the logical channel group that is pending the uplink transmission, a type of the wireless communication device, or a latency of communications of the wireless communication device. For example, the long/short BSR decision circuitry 647, shown and described above in connection with FIG. 6, may provide a means for obtaining a decision-point value.

As described above in connection with FIG. 6, the decision-point value may be based on a first respective value assigned to a peak power envelope of the wireless communication device. The first respective value may be obtained by the wireless communication device based on known specifications of the wireless communication device. In some examples, the first respective value may increase as the peak power envelope increases. For example, the communication and processing circuitry 641, shown and described above in connection with FIG. 6, may provide a means for obtaining the respective value associated with the peak power envelope of the UE.

In some examples, the decision-point value may be based on a respective value assigned to a data transmission rate. In some examples, the wireless communication device may obtain the respective value from historical data stored in a memory of the wireless communication device. In some examples, the respective value assigned to the data transmission rate may be obtained from, or obtained using, the data transmission rate historical data 627 stored in the memory 608 of the wireless communication device 600. For example, the communication and processing circuitry 641, shown and described above in connection with FIG. 6, may provide a means for obtaining the respective value from historical data stored in the memory of the wireless communication device. The data may be stored, for example, in the data transmission rate historical data 627 section of the memory 608 of the wireless communication device.

In some aspects, the decision-point value may be based on a respective value assigned to a number of component carriers allocated to the wireless communication device. In some examples, the number of component carriers allocated or scheduled to the wireless communication device may be determined based on scheduling information received by the wireless communication device, for example. According to some aspects, the respective value assigned to the number of component carriers allocated or scheduled for the wireless communication device may increase as the number of component carriers increases. For example, the communication and processing circuitry 641, shown and described above in connection with FIG. 6, may provide a means for obtaining the respective value associated with the number of component carriers allocated or scheduled to the UE.

In some aspects, the decision-point value may be based on a respective value assigned to a cost function. In some examples, the respective value assigned to the cost function may be determined at the wireless communication device. For example, the respective value assigned to the cost function may be obtained by a comparison of a first amount of power required to transmit the quantity of data utilizing a single component carrier having a first channel capacity to a second amount of power required to transmit the quantity of data in a plurality of component carriers having a collective channel capacity. According to some aspects, the respective value assigned to the cost function may increase as the first amount of power decreases relative to the second amount of power. For example, the communication and processing circuitry 641, shown and described above in connection with FIG. 6, may provide a means for obtaining the respective value of the cost function. For example, the communication and processing circuitry 641, shown and described above in connection with FIG. 6, may further provide a means for comparing: a first amount of power required to transmit the quantity of data utilizing a single component carrier having a first channel capacity, to a second amount of power required to transmit the quantity of data in a plurality of component carriers having a collective channel capacity.

In some aspects, the decision-point value may be based on a respective value assigned to an amount of data associated with the logical channel group. In some examples, the respective value assigned to the amount of data associated with the logical channel group may be determined by the wireless communication device, by, for example determining the amount of data stored at the wireless communication device that is associated with the logical channel group and associating that determined amount of data with the respective value. For example, a table stored at the wireless communication device may cross-reference certain values (e.g., the respective values) to predetermined value ranges of data that may be stored in a buffer, such as any one of the $1^{st}$ buffer 621 to the $n^{th}$ buffer 623 as shown and described in connection with FIG. 6). According to some aspects, the respective value assigned to the amount of data associated with the logical channel group may decrease as the amount of data decreases. For example, the communication and processing circuitry 641, shown and described above in connection with FIG. 6, may provide a means for obtaining the respective value assigned to the amount of data associated with the logical channel group.

In some aspects, the decision-point value may be based on a respective value associated with a type of the wireless communication device. In some examples, the respective value associated with the type of the wireless communication device may be determined based on a parameter stored at the wireless communication device, where the parameter identifies the wireless communication device's type. By way of example and not limitation, a first type may be customer premises equipment; a second type may be a smartphone with long term evolution (LTE) capability; a third type may be a smartphone with 5G capability. For example, according to some aspects, the sixth respective value associated with the type of the wireless communication device may be greater for non-customer premise equipment than for customer premise equipment. For example, the communication and processing circuitry 641, shown and described above in connection with FIG. 6, may provide a means for obtaining the respective value associated with the type of wireless communication device assigned to the UE.

In some aspects, the decision-point value may be based on a respective value associated with a measure of, or an expected value of, latency of communications of the wireless communication device. In some examples, the respective value of latency of communications of the wireless communication device may be obtained by measuring end-to-end latency. For example, the end-to-end latency of the communication path between the wireless communication device 412, the satellite 410*a*, and the satellite gateway 414 may be measured. Alternatively, the round-trip time between the wireless communication device 412, the satellite 410*a*, and the satellite gateway 414 may be measured. Other ways to obtain latency and other latency measures are within the scope of the disclosure. According to some aspect described herein, the latency may be referred to as the latency of communications of the wireless communication device. According to some aspects, a lower value representative of the latency of communications of the wireless communication device may be better than a relatively higher value. According to some aspects the value representative of the latency of communications of the wireless communication device may be referred to as the seventh respective herein. The application associated with the communications of the wireless communication device may inform a decision (e.g., made by a base station) regarding the importance of the value representative of the latency. For example, a relatively lower latency may be less important (and may be given less weight) in applications related to massive machine-type communication (mMTC) than in applications related to ultra-reliable low-latency communications (uRLLC). For example, the communication and processing circuitry 641, shown and described above in connection with FIG. 6, may provide a means for obtaining the respective value associated with the latency of communications of the wireless communication device.

At 706, the wireless communication device may determine if the obtained decision-point value exceeds a threshold value. At 708, if the decision-point value exceeds the threshold value, the wireless communication device may send (e.g., report), for a logical channel group having a first quantity of data pending an uplink transmission, a long buffer status report in response to the decision-point value exceeding the threshold value. At 710, if the decision-point value does not exceed the threshold value, the wireless communication device may send (e.g., report), for the logical channel group, a short buffer status report in response to the decision-point value being equal to or less than the threshold value. Of course, the general representations concerning the threshold value and the decision as to whether the decision-point value exceeds the threshold value are provided as examples only. In other examples, a decision to send a long buffer status report may be made in response to the decision point value being equal to or greater than the threshold value, while the decision to send the short buffer status report may be made in response to the decision-point value being less than the threshold value). In still other examples, a decision to send a long buffer status report may be made in response to the decision-point value being less than (or less than or equal to) the threshold value, while the decision to send the short buffer status report may be made in response to the decision-point value being greater than or equal to (or greater than) the threshold value.

Of course, in the above examples, the circuitry included in the processor 604 merely provided as an example. Other means for carrying out the described processes or functions may be included within various aspects of the present disclosure, including but not limited to the instructions stored in the computer-readable medium 610 or any other suitable apparatus or means described in any one of the FIGS. 1, 2, 4, 5, and/or 6 and utilizing, for example, the processes and/or algorithms described herein in relation to FIGS. 4, 5, and/or 7.

The following provides an overview of aspects of the present disclosure:

Aspect 1: A wireless communication device, comprising: a wireless transceiver; a memory, and a processor communicatively coupled to the wireless transceiver and the memory, the processor and the memory being configured to: obtain a decision-point value, send, for a logical channel group having a quantity of data pending an uplink transmission, a long buffer status report in response to the decision-point value exceeding a threshold value, and send, for the logical channel group, a short buffer status report in response to the decision-point value being equal to or less than the threshold value.

Aspect 2: The wireless communication device of aspect 1, wherein the decision-point value is a buffer status report (BSR)-type determinative value.

Aspect 3: The wireless communication device of aspect 2, wherein the BSR-type determinative value is based on respective values assigned to at least one of: a peak power envelope of the wireless communication device, a data transmission rate historically obtained by the wireless communication device, a number of component carriers available to be scheduled for a complete upload of a buffer holding data, a cost function, an amount of data associated with the logical channel group that is pending the uplink transmission, a type of the wireless communication device, or a latency of communications of the wireless communication device.

Aspect 4: The wireless communication device of any of aspects 1 through 3, wherein: the decision-point value is based on a respective value assigned to a peak power envelope of the wireless communication device, and the respective value increases as the peak power envelope increases.

Aspect 5: The wireless communication device of any of aspects 1 through 4, wherein: the decision-point value is based on a respective value assigned to a data transmission rate; and the processor and the memory are further configured to: obtain the respective value from historical data stored in the memory of the wireless communication device.

Aspect 6: The wireless communication device of any of aspects 1 through 5, wherein: the decision-point value is based on a respective value assigned to a number of component carriers allocated to the wireless communication device, and the respective value increases as the number of component carriers increases.

Aspect 7: The wireless communication device of any of aspects 1 through 6, wherein: the decision-point value is based on a respective value assigned to a cost function.

Aspect 8: The wireless communication device of aspect 7, wherein the processor and the memory are further configured to obtain the respective value assigned to the cost function by comparing: a first amount of power required to transmit the quantity of data utilizing a single component carrier having a first channel capacity, to a second amount of power required to transmit the quantity of data in a plurality of component carriers having a collective channel capacity, wherein the respective value assigned to the cost function increases as the first amount of power decreases relative to the second amount of power.

Aspect 9: The wireless communication device of any of aspects 1 through 8, wherein: the decision-point value is based on a respective value assigned to an amount of data associated with the logical channel group, and the respective value decreases as the amount of data decreases.

Aspect 10: The wireless communication device of any of aspects 1 through 9, wherein: the decision-point value is based on a respective value associated with a type of the wireless communication device, and the respective value is greater for non-customer premise equipment than for customer premise equipment.

Aspect 11: A method at a wireless communication device, comprising: obtaining a decision-point value, sending, for a logical channel group having a quantity of data pending an uplink transmission, a long buffer status report in response to the decision-point value exceeding a threshold value, and sending, for the logical channel group, a short buffer status report in response to the decision-point value being equal to or less than the threshold value.

Aspect 12: The method of aspect 11, wherein the decision-point value is a buffer status report (BSR)-type determinative value.

Aspect 13: The method of aspect 12, wherein the BSR-type determinative value is based on respective values assigned to at least one of: a peak power envelope of the wireless communication device, a data transmission rate historically obtained by the wireless communication device, a number of component carriers available to be scheduled for a complete upload of a buffer holding data, a cost function, an amount of data associated with the logical channel group that is pending the uplink transmission, a type of the wireless communication device, or a latency of communications of the wireless communication device.

Aspect 14: The method of any of aspects 11 through 13, wherein: the decision-point value is based on a respective value assigned to a peak power envelope of the wireless communication device, and the respective value increases as the peak power envelope increases.

Aspect 15: The method of any of aspects 11 through 14, wherein: the decision-point value is based on a respective value assigned to a data transmission rate; and the method further comprises: obtaining the respective value from historical data stored in a memory of the wireless communication device.

Aspect 16: The method of any of aspects 11 through 15, wherein: the decision-point value is based on a respective value assigned to a number of component carriers allocated to the wireless communication device, and the respective value increases as the number of component carriers increases.

Aspect 17: The method of any of aspects 11 through 16, wherein: the decision-point value is based on a respective value assigned to a cost function.

Aspect 18: The method of aspect 17, the method further comprising: obtaining the respective value assigned to the cost function by comparing: a first amount of power required to transmit the quantity of data utilizing a single component carrier having a first channel capacity, to a second amount of power required to transmit the quantity of data in a plurality of component carriers having a collective channel capacity, wherein the respective value assigned to the cost function increases as the first amount of power decreases relative to the second amount of power.

Aspect 19: The method of any of aspects 11 through 18, wherein: the decision-point value is based on a respective value assigned to an amount of data associated with the logical channel group, and the respective value decreases as the amount of data decreases.

Aspect 20: The method of any of aspects 11 through 19, wherein: the decision-point value is based on a respective value associated with a type of the wireless communication device, and the respective value is greater for non-customer premise equipment than for customer premise equipment.

Aspect 21: A wireless communication device, comprising: means for obtaining a decision-point value, means for sending, for a logical channel group having a quantity of data pending an uplink transmission, a long buffer status report in response to the decision-point value exceeding a threshold value, and means for sending, for the logical channel group, a short buffer status report in response to the decision-point value being equal to or less than the threshold value.

Aspect 22: The wireless communication device of aspect 21, wherein the decision-point value is a buffer status report (BSR)-type determinative value.

Aspect 23: The wireless communication device of aspect 22, wherein the BSR-type determinative value is based on respective values assigned to at least one of: a peak power envelope of the wireless communication device, a data transmission rate historically obtained by the wireless communication device, a number of component carriers available to be scheduled for a complete upload of a buffer holding data, a cost function, an amount of data associated with the logical channel group that is pending the uplink transmission, a type of the wireless communication device, or a latency of communications of the wireless communication device.

Aspect 24: The wireless communication device of any of aspects 21 through 23, wherein: the decision-point value is based on a respective value assigned to a peak power envelope of the wireless communication device, and the respective value increases as the peak power envelope increases.

Aspect 25: The wireless communication device of any of aspects 21 through 24, wherein: the decision-point value is based on a respective value assigned to a data transmission rate; and the wireless communication device further comprises: means for obtaining the respective value from historical data stored in a memory of the wireless communication device.

Aspect 26: The wireless communication device of any of aspects 21 through 25, wherein: the decision-point value is based on a respective value assigned to a number of component carriers allocated to the wireless communication device, and the respective value increases as the number of component carriers increases.

Aspect 27: The wireless communication device of any of aspects 21 through 26, wherein: the decision-point value is based on a respective value assigned to a cost function.

Aspect 28: The wireless communication device of aspect 27, wherein the wireless communication device further comprises: means for obtaining the respective value assigned to the cost function including means for comparing: a first amount of power required to transmit the quantity of data utilizing a single component carrier having a first channel capacity, to a second amount of power required to transmit the quantity of data in a plurality of component carriers having a collective channel capacity, wherein the respective value assigned to the cost function increases as the first amount of power decreases relative to the second amount of power.

Aspect 29: The wireless communication device of any of aspects 21 through 28, wherein: the decision-point value is based on a respective value assigned to an amount of data associated with the logical channel group, and the respective value decreases as the amount of data decreases.

Aspect 30: The wireless communication device of any of aspects 21 through 29, wherein: the decision-point value is based on a respective value associated with a type of the wireless communication device, and the respective value is greater for non-customer premise equipment than for customer premise equipment.

Aspect 31: A non-transitory computer-readable medium storing computer-executable code, comprising code for causing an apparatus to perform a method of any one of aspects 11 through 20.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-7 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein. While some examples illustrated herein depict only time and frequency domains, additional domains such as a spatial domain are also contemplated in this disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The construct A and/or B is intended to cover: A; B; and A and B. The word "obtain" as used herein may mean, for example, acquire, calculate, construct, derive, determine, receive, and/or retrieve. The preceding list is exemplary and not limiting. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A wireless communication device, comprising:
   a wireless transceiver;
   a memory; and
   a processor communicatively coupled to the wireless transceiver and the memory, the processor and the memory being configured to:
      obtain a decision-point value, wherein the decision-point value is based on a respective value assigned to a peak power envelope of the wireless communication device;
      send, for a logical channel group having a quantity of data pending an uplink transmission, a long buffer status report in response to the decision-point value exceeding a threshold value; and
      send, for the logical channel group, a short buffer status report in response to the decision-point value being equal to or less than the threshold value.

2. The wireless communication device of claim 1, wherein the decision-point value is further based on an additional respective value assigned to at least one of:
   a cost function,
   a type of the wireless communication device, wherein the type is a non-customer premise equipment type or a customer premise equipment type of wireless communication device, or
   a latency of communications of the wireless communication device.

3. The wireless communication device of claim 1, wherein:
   the respective value assigned to the peak power envelope of the wireless communication device
   increases as the peak power envelope increases.

4. The wireless communication device of claim 1, wherein:
   the decision-point value is further based on an additional respective value assigned to a data transmission rate; and the processor and the memory are further configured to:
      obtain the additional respective value from historical data stored in the memory of the wireless communication device.

5. The wireless communication device of claim 1, wherein:
   the decision-point value is further based on an additional respective value assigned to a number of component carriers allocated to the wireless communication device; and
   the additional respective value increases as the number of component carriers increases.

6. The wireless communication device of claim 1, wherein:
   the decision-point value is further based on an additional respective value assigned to a cost function.

7. The wireless communication device of claim 6, wherein the processor and the memory are further configured to obtain the additional respective value assigned to the cost function by comparing:
   a first amount of power required to transmit the quantity of data utilizing a single component carrier having a first channel capacity, to
   a second amount of power required to transmit the quantity of data in a plurality of component carriers having a collective channel capacity, wherein
   the additional respective value assigned to the cost function increases as the first amount of power decreases relative to the second amount of power.

8. The wireless communication device of claim 1, wherein:
the decision-point value is further based on an additional respective value assigned to an amount of data associated with the logical channel group, and
the additional respective value decreases as the amount of data decreases.

9. The wireless communication device of claim 1, wherein:
the decision-point value is further based on an additional respective value associated with a type of the wireless communication device, and
the additional respective value is greater for non-customer premise equipment than for customer premise equipment.

10. A method at a wireless communication device, comprising:
obtaining a decision-point value, wherein the decision-point value is based on a respective value assigned to a peak power envelope of the wireless communication device;
sending, for a logical channel group having a quantity of data pending an uplink transmission, a long buffer status report in response to the decision-point value exceeding a threshold value; and
sending, for the logical channel group, a short buffer status report in response to the decision-point value being equal to or less than the threshold value.

11. The method of claim 10, wherein the decision-point value is further based on an additional respective value assigned to at least one of:
a cost function,
a type of the wireless communication device, wherein the type is a non-customer premise equipment type or a customer premise equipment type of wireless communication device, or
a latency of communications of the wireless communication device.

12. The method of claim 10, wherein:
the respective value assigned to the peak power envelope of the wireless communication device
increases as the peak power envelope increases.

13. The method of claim 10, wherein:
the decision-point value is further based on an additional respective value assigned to a data transmission rate; and the method further comprises:
obtaining the additional respective value from historical data stored in a memory of the wireless communication device.

14. The method of claim 10, wherein:
the decision-point value is further based on an additional respective value assigned to a number of component carriers allocated to the wireless communication device; and
the additional respective value increases as the number of component carriers increases.

15. The method of claim 10, wherein:
the decision-point value is further based on an additional respective value assigned to a cost function.

16. The method of claim 15, the method further comprising:
obtaining the additional respective value assigned to the cost function by comparing:
a first amount of power required to transmit the quantity of data utilizing a single component carrier having a first channel capacity, to
a second amount of power required to transmit the quantity of data in a plurality of component carriers having a collective channel capacity, wherein
the additional respective value assigned to the cost function increases as the first amount of power decreases relative to the second amount of power.

17. The method of claim 10, wherein:
the decision-point value is further based on an additional respective value assigned to an amount of data associated with the logical channel group, and
the additional respective value decreases as the amount of data decreases.

18. The method of claim 10, wherein:
the decision-point value is further based on an additional respective value associated with a type of the wireless communication device, and
the additional respective value is greater for non-customer premise equipment than for customer premise equipment.

19. A wireless communication device, comprising:
means for obtaining a decision-point value, wherein the decision-point value is based on a respective value assigned to a peak power envelope of the wireless communication device;
means for sending, for a logical channel group having a quantity of data pending an uplink transmission, a long buffer status report in response to the decision-point value exceeding a threshold value; and
means for sending, for the logical channel group, a short buffer status report in response to the decision-point value being equal to or less than the threshold value.

20. The wireless communication device of claim 19, wherein the decision-point value is further based on an additional respective value assigned to at least one of:
a cost function,
a type of the wireless communication device, wherein the type is a non-customer premise equipment type or a customer premise equipment type of wireless communication device, or
a latency of communications of the wireless communication device.

21. The wireless communication device of claim 19, wherein:
the respective value assigned to the peak power envelope of the wireless communication device
increases as the peak power envelope increases.

22. The wireless communication device of claim 19, wherein:
the decision-point value is further based on an additional respective value assigned to a data transmission rate; and the wireless communication device further comprises:
means for obtaining the additional respective value from historical data stored in a memory of the wireless communication device.

23. The wireless communication device of claim 19, wherein:
the decision-point value is further based on an additional respective value assigned to a number of component carriers allocated to the wireless communication device; and
the additional respective value increases as the number of component carriers increases.

24. The wireless communication device of claim 19, wherein:
the decision-point value is further based on an additional respective value assigned to a cost function.

25. The wireless communication device of claim 24, wherein the wireless communication device further comprises:
means for obtaining the additional respective value assigned to the cost function including means for comparing:
a first amount of power required to transmit the quantity of data utilizing a single component carrier having a first channel capacity, to
a second amount of power required to transmit the quantity of data in a plurality of component carriers having a collective channel capacity, wherein
the additional respective value assigned to the cost function increases as the first amount of power decreases relative to the second amount of power.

26. The wireless communication device of claim 19, wherein:
the decision-point value is further based on an additional respective value assigned to an amount of data associated with the logical channel group, and
the additional respective value decreases as the amount of data decreases.

27. The wireless communication device of claim 19, wherein:
the decision-point value is further based on an additional respective value associated with a type of the wireless communication device, and
the additional respective value is greater for non-customer premise equipment than for customer premise equipment.

28. A wireless communication device, comprising:
a wireless transceiver;
a memory; and
a processor communicatively coupled to the wireless transceiver and the memory, the processor and the memory being configured to:
obtain a decision-point value, wherein the decision-point value is based on a respective value assigned to a cost function;
send, for a logical channel group having a quantity of data pending an uplink transmission, a long buffer status report in response to the decision-point value exceeding a threshold value; and
send, for the logical channel group, a short buffer status report in response to the decision-point value being equal to or less than the threshold value.

29. A wireless communication device, comprising:
a wireless transceiver;
a memory; and
a processor communicatively coupled to the wireless transceiver and the memory, the processor and the memory being configured to:
obtain a decision-point value, wherein the decision-point value is based on a respective value associated with a type of the wireless communication device, wherein the type is a non-customer premise equipment type or a customer premise equipment type of wireless communication equipment;
send, for a logical channel group having a quantity of data pending an uplink transmission, a long buffer status report in response to the decision-point value exceeding a threshold value; and
send, for the logical channel group, a short buffer status report in response to the decision-point value being equal to or less than the threshold value.

30. A wireless communication device, comprising:
a wireless transceiver;
a memory; and
a processor communicatively coupled to the wireless transceiver and the memory, the processor and the memory being configured to:
obtain a decision-point value, wherein the decision-point value is based on a respective value associated with a latency of communications of the wireless communication device;
send, for a logical channel group having a quantity of data pending an uplink transmission, a long buffer status report in response to the decision-point value exceeding a threshold value; and
send, for the logical channel group, a short buffer status report in response to the decision-point value being equal to or less than the threshold value.

* * * * *

UNITED STATES PATENT AND TRADEMARK OFFICE
CERTIFICATE OF CORRECTION

PATENT NO. : 12,120,549 B2
APPLICATION NO. : 17/738933
DATED : October 15, 2024
INVENTOR(S) : Nitin Agarwal et al.

Page 1 of 1

It is certified that error appears in the above-identified patent and that said Letters Patent is hereby corrected as shown below:

In the Specification

Column 5 Lines 58-59: the phrase "In addition, the uplink and/or downlink control 118 and or 118 information" is replaced with "In addition, the uplink and/or downlink control 118 and/or 114 information".

Column 21 Line 54 the phrase "resource allocation detection circuitry/function 515" is replaced with "resource allocation detection circuitry/function 525".

Column 30 Line 47 the phrase "may be referred to as the seventh respective herein" is replaced with "may be referred to as the seventh respective value herein".

Signed and Sealed this
Twenty-sixth Day of November, 2024

Katherine Kelly Vidal
*Director of the United States Patent and Trademark Office*